United States Patent
Beach et al.

[11] Patent Number: 5,617,492
[45] Date of Patent: Apr. 1, 1997

[54] FIBER OPTIC COUPLING OF A MICROLENS CONDITIONED, STACKED SEMICONDUCTOR LASER DIODE ARRAY

[75] Inventors: Raymond J. Beach; William J. Benett, both of Livermore; Steven T. Mills, Antioch, all of Calif.

[73] Assignee: The Regents of the University of California, Oakland, Calif.

[21] Appl. No.: 597,331

[22] Filed: Feb. 6, 1996

[51] Int. Cl.⁶ .................................................. G02B 6/32
[52] U.S. Cl. ............................................................ 385/33
[58] Field of Search .............................. 385/33–34, 74, 385/93, 137, 119; 372/101; 359/710, 708, 623; 65/102, 433, 435

[56] References Cited

U.S. PATENT DOCUMENTS

| | | | |
|---|---|---|---|
| 4,380,365 | 4/1983 | Gross | 385/33 |
| 5,080,706 | 1/1992 | Synder et al. | 65/102 |
| 5,081,639 | 1/1992 | Baer et al. | 385/34 |
| 5,127,068 | 6/1992 | Baer et al. | 385/34 |
| 5,155,631 | 10/1992 | Snyder et al. | 359/708 |
| 5,181,224 | 1/1993 | Snyder | 372/101 |
| 5,436,990 | 7/1995 | Head et al. | 385/34 |

*Primary Examiner*—Akm E. Ullah
*Attorney, Agent, or Firm*—Henry P. Satorio; John P. Wooldridge

[57] ABSTRACT

The output radiation from the two-dimensional aperture of a semiconductor laser diode array is efficiently coupled into an optical fiber. The two-dimensional aperture is formed by stacking individual laser diode bars on top of another in a "rack and stack" configuration. Coupling into the fiber is then accomplished using individual microlenses to condition the output radiation of the laser diode bars. A lens that matches the divergence properties and wavefront characteristics of the laser light to the fiber optic is used to focus this conditioned radiation into the fiber.

9 Claims, 2 Drawing Sheets

FIBER OPTIC COUPLING OF A MICROLENS CONDITIONED, STACKED SEMICONDUCTOR LASER DIODE ARRAY

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to medical, industrial and material processing applications requiring the delivery of optical radiation by fiber optics, and more specifically, it relates to a means for coupling the output of a semiconductor laser diode array into a fiber optic.

2. Description of Related Art

Laser diodes provide an efficient and compact technology for converting electrical power directly into coherent light. However, because the radiation produced by these devices is highly divergent in at least one spatial direction, it has been problematic to efficiently couple their radiation into optical fibers. Diode bars are the highest average power and the most mature form of semiconductor laser diode arrays.

U.S. Pat. No. 5,436,990, directed to an apparatus for coupling a multiple emitter laser diode to a multimode optical fiber, discloses a small diameter multimode optical fiber with a low numerical aperture (i.e., 0.1) that is used as a microlens to collimate the output emissions of a laser diode before butt coupling the output of the laser diode to an optical fiber. The optical fiber used as the microlens is chosen such that its diameter roughly equals the diameter of the fiber to be coupled to the laser diode. One end of the fiber is mounted in a fixed position and the other en the fiber is slip fit into the end of a hollow receiving member mounted in a fixed position and running parallel to the axis of the fiber. The collimation is performed in the high NA direction of the output of the laser diode. The output of a bundle of butt coupled optical fibers may be used to pump a laser system.

U.S. Patent No. 5,333,077, directed to a method and apparatus for efficient concentration of light from laser diode arrays, discloses a lens system for use with a light beam having a spatial cross-sectional distribution which is extended predominantly in one direction, including a first optical element for receiving and redirecting different portions of the light beam to different locations on an imaginary plane wherein at least two portions of said light beam are directed along two non-parallel paths so as to generate a two-dimensional pattern of light on the imaginary plane; and a second optical element located at the imaginary plane and aligned with the two-dimensional pattern of light for redirecting each portion of the two-dimensional pattern of light to a focal point. Alternatively, the lens system of the invention may be used to receive and redirect to a focal point each individual light beam of a linear array of light beams, or each portion of a two-dimensional light beam, or each individual light beam of a two-dimensional array of light beams.

SUMMARY OF THE INVENTION

It is an object of the present invention to provide a means for coupling the output of a stacked semiconductor laser diode array into a fiber optic.

The present invention is a system for efficiently coupling the output radiation from a two-dimensional aperture of semiconductor laser diode array into an optical fiber. The two-dimensional aperture is formed by stacking laser diode bars to produce an array. Individual microlenses condition the output radiation of the laser diode bars to provide coupling into the fiber. A simple lens is then used to focus this conditioned radiation into the fiber. The focal length of the lens is chosen such that the divergence of the laser light after it passes through the lens is not greater than the numerical aperture of the fiber optic. The lens must focus the laser light to a spot size that is less than to equal to the input aperture of the fiber optic.

In one embodiment of the present invention, a 5 module stack of microchannel cooled laser diode arrays with microlens conditioned outputs is used as the radiation source. The emitted diode radiation is collected and focused by an ordinary short focal length lens (1 cm focal length) on to the input end of an optical fiber. Using a 1 mm core fused silica fiber with a 0.37 numerical aperture, the ratio of the laser diode radiation emanating from the end of a 2 meter long fiber without optical coatings to the total radiation produced by the laser diode arrays (the measured efficiency of the present invention) was 0.58. The wavelength of the laser diode arrays used was 690 μm.

DETAILED DESCRIPTION OF THE INVENTION

Figure 1:
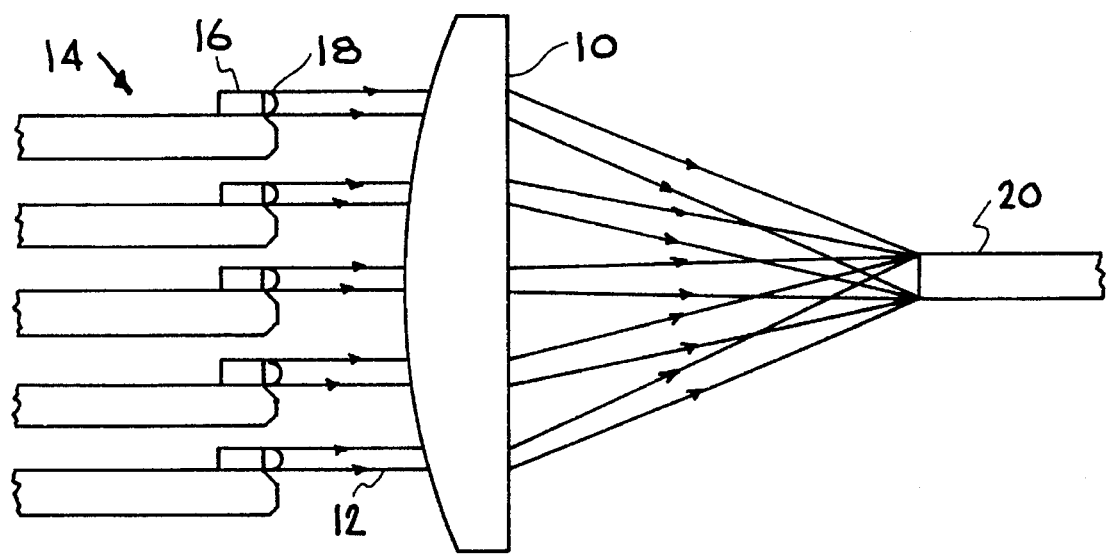
FIG. 1 illustrates the use of a simple lens to directly couple radiation from an extended microlens-conditioned stack of laser diode arrays into an optical fiber.
Figure 2:
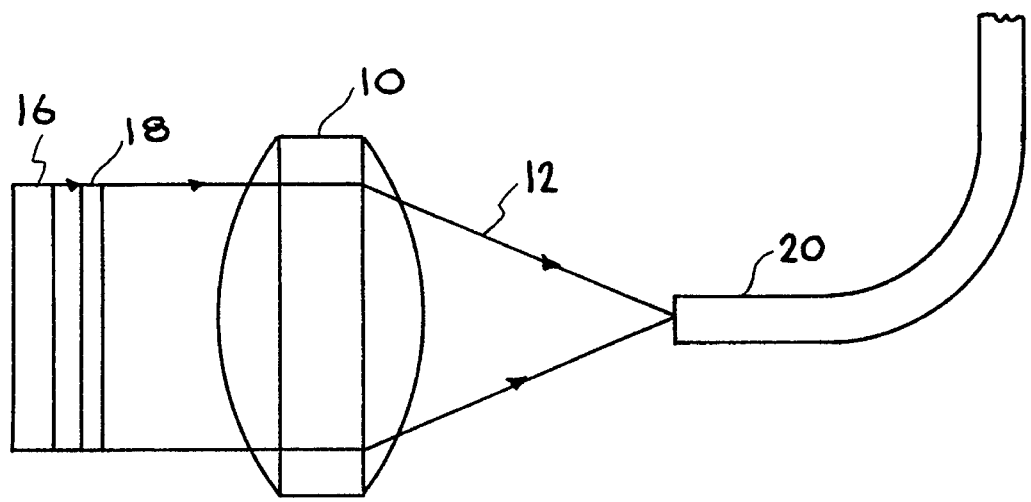
FIG. 2 shows a top view of the system of FIG. 1

Referring to FIG. 1, a simple lens 10 directly couples radiation 12 from an array 14 of laser diode bars 16, each having a micro-lens 18, into an optical fiber 20. The two-dimensional aperture (wavefront) formed from the array 14 of microlens-conditioned laser diode bars 16 is coupled into the optical fiber 20 by the simple focusing lens 10. FIG. 2 shows a top view with similar elements identically numbered.

The simple lens is chosen to have a focal length such that the divergence of the focusing laser diode light after the lens is matched to, or less than, the numerical aperture of the fiber into which the light is being coupled. This ensures that the light that enters the fiber will be efficiently guided along the length of the fiber by the waveguide structure of the fiber. As an example, the fiber in FIG. 2 has a numerical aperture of 0.37 which means that light coming into it at an angle to the optic axis greater than Arcsin(0.37)=21.7° will not be confined by the fiber's waveguide structure and so will not be transported down the fiber. In this particular case, the focal length of the simple focusing lens was chosen to be 1 cm so that the maximal angle the diode light makes with the optic axis in this problem is determined by the 0.5 cm side length of the square diode array aperture and the 1 cm focal length of the simple lens to be Arctan((0.5 cm/√2 )/1 cm)=19.5° ensuring the light delivered into the fiber will be transported along its length.

A constraint on the maximum focal length of the simple lens is the requirement that it is consistent with the requirements for good coupling efficiency. This maximum allowable focal length is determined by the divergence characteristics of the diode array. The spot size of the diode radiation at the focus of the simple lens is determined approximately by the product of the laser diode radiation divergence after the microlenses but before the simple lens and the focal length of the simple lens. To ensure good coupling efficiency of the diode radiation into the optical fiber it is necessary that the dimensions of the focal spot be less than or equal to the dimension of the fiber aperture. As an example, if the diode radiation in FIG. 2 is characterized by a divergence angle of 100 mrad after the microlenses but before the simple focusing lens, then the diameter of the diode radiation at the focus of the 1 cm focal length lens will be given by (0.1 Rad)×1 cm=1 mm. This allows the diode light at the focal spot to be efficiently coupled into the optical fiber which has a 1 mm diameter input area.

Figure 3:
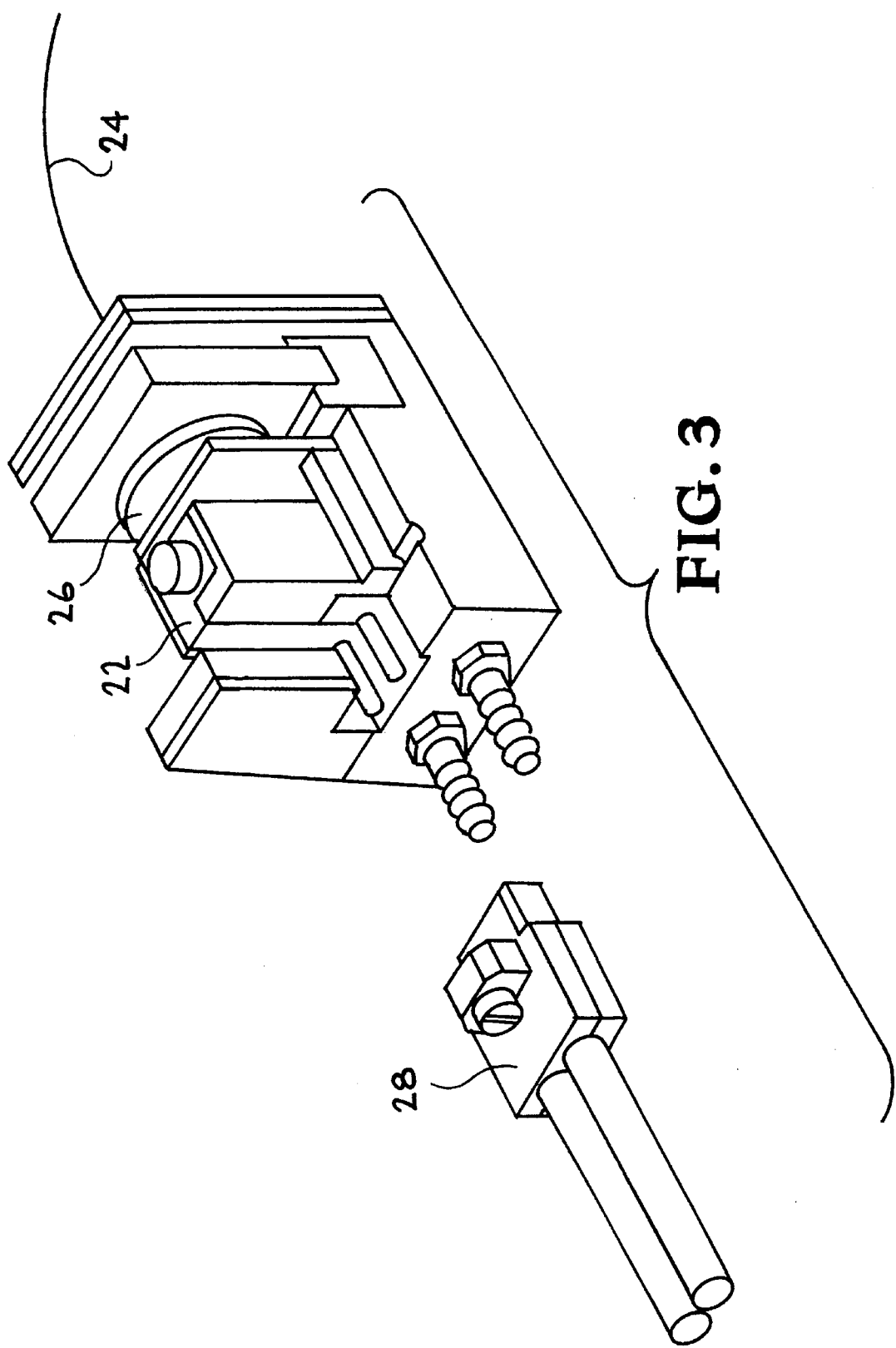
FIG. 3 shows a diode-to-fiber coupling package.

FIG. 3 shows a diode-to-fiber coupling unit. In this hardware, a five diode bar stack 22 of 5 mm long AlGaInP laser diode bars emitting at 690 mm is delivered into a 0.37 NA, 1 mm core fused silica optical fiber 24. A simple 1 cm focal length spherical lens 26 is used to focus the stack 22 output into the fiber 24. Water and electrical connections are made through adapter 28. In this application, the slow axis (unconditioned direction) divergence angle of the emitted laser diode radiation limits the usable diode bar length to ~5 mm. The measured coupling efficiency of the entire post-diode optics chain, including microlenses, 1 cm focal length spherical lens, and uncoated optical fiber, is 58% at the output end of the fiber.

One of the advantages of the diode-to-fiber coupling scheme described here as opposed to the more prevalent commercial approach, in which individual "fiberlets" are butt-coupled to emitting apertures and then rebundled into a single larger fiber, is the flexibility and robustness of the package. The technology using the individual butt-coupled fiberlets requires a precision alignment of the fiberlets to the emitting apertures and generally leads to a sealed unit in which the laser diode array and fiberlets cannot be easily separated if it becomes necessary to replace either the diode or the fiber. The present invention allows the use of an SMA coupled fiber that can be quickly and easily replaced using its socketed connector. This is advantageous for medical applications where it may be necessary to replace the fiber on a routine basis. Additionally, in the present invention, the entire laser diode array can be removed and serviced easily and quickly because it does not require the precision alignment that characterizes the fiberlet approach to coupling. Thus, a single unit can provide multiple wavelengths at different times by simply swapping in and out different diode stacks.

A device utilizing the design shown in FIG. 3 has delivered 22 W of CW 690 nm radiation at the end of the fiber. This particular piece of hardware was built for a photodynamic therapy (PDT) application. Additional applications of such units are anticipated in the field of material processing where it is envisioned they could deliver ~50 W of CW radiation using AlGaAs or InGaAs laser diode arrays. Because of the non-zero divergence of the microlens-conditioned laser diode source in both the fast axis and slow axis direction, the scalability of our approach is essentially limited to the stack array size described here (5 mm×5 mm aperture) for the 1 mm core, large numerical aperture fibers used.

The microchannel cooler technology is disclosed in U.S. Pat. No. 5,105,429, which is incorporated herein by reference. The laser diode array includes a plurality of planar packages and active cooling. The laser diode array may be operated in a long duty cycle, or in continuous operation. A laser diode bar and a microchannel heat sink are thermally coupled in a compact, thin planar package having the laser diode bar located proximate to one edge. In an array, a number of such thin planar packages are secured together in a stacked configuration, in close proximity so that the laser diodes are spaced closely. The cooling means includes a microchannel heat sink that is attached proximate to the laser bar so that it absorbs heat generated by laser operation. To provide the coolant to the microchannels, each thin planar package comprises a thin inlet manifold and a thin outlet manifold connected to an inlet corridor and an outlet corridor. The inlet corridor comprises a hole extending through each of the packages in the array, and the outlet corridor comprises a hole extending through each of the packages in the array. The inlet and outlet corridors are connected to a conventional coolant circulation system. The laser diode array with active cooling has application as an optical pump for high power solid state lasers. Further, it can be incorporated in equipment such as communications devices and active sensors, and in military and space applications, and it can be useful in applications having space constraints and energy limitations.

One embodiment of the laser diode array used in this invention comprises a compact, thin planar package including a laser diode bar and cooling means internal to the package. Electric current is provided to the laser diode bar by a conventional electric current source. The laser diode bar is positioned proximate to the edge so that emitted laser light is substantially unobstructed by the top surface. Coolant such as water is circulated through the package by a conventional coolant circulation system. Coolant enters the package through an inlet corridor, and exits through an outlet corridor.

When a plurality of these packages are connected to form an array, a number of the thin planar packages are secured together in a stacked arrangement. In this embodiment, the planar packages are secured together by a bolt extending through a hole formed in the packages. In other embodiments, an array may comprise any number of the packages from two and up. On the bottom side of the bottom package, the bolt is secured by a nut. Coolant is provided from the coolant circulation system through an inlet tube and an outlet tube. In an array, the thin packages are connectable in such close proximity that the laser diode bars are very closely spaced and therefore provide a high intensity laser output over an area as large as the number of packages.

Each package is constructed of three separate wafers. When bonded together, the wafers provide the package that has cooling means integral therein. The top wafer preferably comprises a silicon substrate, the middle wafer comprises a glass material, and the bottom wafer preferably comprises a silicon substrate. The bottom wafer comprises a manifold that is etched on its top surface. The manifold may comprise a series of ribs, such as the rib which provides structural strength to the manifold. When the bottom wafer is bonded to the middle wafer, the manifold forms a passageway for coolant flow between the inlet corridor and a slot formed in the middle wafer.

A manifold is formed in the top wafer to create a passageway for coolant flow between the outlet corridor and a microchannel heat sink. A plurality of ribs are provided in the manifold, which provide structural strength to the manifold. The heat sink is formed in the top wafer proximate to the laser diode bar. In that position, the heat sink conducts heat away from the laser diode bar, to the coolant flowing through it. The heat sink comprises a plurality of microchannels formed in the substrate of the silicon wafer in accordance with conventional techniques.

In operation, coolant provided in the inlet corridor flows into and through the inlet manifold, and then into the slot. From there, coolant flows into the microchannel heat sink where heat from the laser diode bar is absorbed. Then, the heated coolant flows through the manifold formed in the top wafer, and into the outlet corridor where it is cooled and recirculated by the coolant circulation system. In an array, the inlet corridor and the outlet corridor is common to all the planar packages in the array, and thus only a single coolant circulation system is required for the entire array.

In an array of packages, the thinness of the wafers is an advantage because the laser diode bars can be positioned in close proximity for high intensity output over a large area, while maintaining a low temperature due to the cooling action of the microchannel heat sinks. Although the packages may appear to be rectangular boxes, in one embodiment the packages are thin planar packages, and therefore can be placed closely together.

U.S. Pat. No. 5,155,631, incorporated herein by reference, provides a diffraction limited, high numerical aperture (fast) cylindrical microlens. The method for making the microlens is adaptable to produce a cylindrical lens that has almost any shape on its optical surfaces. The cylindrical lens may have a shape, such as elliptical or hyperbolic, designed to transform some particular given input light distribution into some desired output light distribution. In the method, the desired shape is first formed in a glass preform. Then, the preform is heated to the minimum drawing temperature and a fiber is drawn from it. The cross-sectional shape of the fiber bears a direct relation to the shape of the preform from which it was drawn. During the drawing process, the surfaces become optically smooth due to fire polishing. The microlens has many applications, such as integrated optics, optical detectors and laser diodes. The lens, when connected to a laser diode bar, can provide a high intensity source of laser radiation for pumping a high average power solid state laser. In integrated optics, a lens can be used to couple light into and out of apertures such as waveguides. The lens can also be used to collect light, and focus it on a detector.

The following are design considerations that may be considered when designing any particular cylindrical microlens. The optical path between the vertex of the dielectric interface and the focus is equated with any other optical path to the focus:

$$n_2 f = n_1 x + n_2 \sqrt{(f-x)^2 + y^2} \quad (1)$$

where $n_1$ and $n_2$ are the indices of refraction of the media to the left and right of the interface, respectively, and f is the focal length from the interface to the focus. The equation can be rearranged into the standard form for a conic section centered at x=a(8)

$$\frac{(x-a)^2}{a^2} + \frac{y^2}{b^2} = 1 \quad (2)$$

where $$a^2 = \left(\frac{fn_2}{n_2+n_1}\right)^2 \quad (3)$$

and $$b^2 = f^2 \left(\frac{\pm \Delta n}{n_2+n_1}\right) \quad (4)$$

are the squares of the semi-major and semi-minor axes, respectively, and $$\Delta n \equiv n_2 - n_1 \quad (5)$$

The eccentricity of the conic section is $$e \cong \sqrt{1 \pm b^2/a^2} = \frac{n_1}{n_2} \quad (6)$$

where the lower sign is Eqs. (4) and (6) holds for $n_1 > n_2$.

There are two categories of surfaces free of spherical aberration. If the high index medium is on the right (i.e., $n_1 > n_2$) then the coefficient of the $y^2$ term in Eq. (2) is positive and the curve is an ellipse. Since the focal point is inside the higher index medium, this form has the properties of an immersion lens. If the high index medium is on the left then the coefficient of the $y^2$ term in Eq. (2) is negative and the curve is a hyperbola. For both curves, the focal point of the lens coincides with a focus of the conic section, since from Eqs. (3) and (6) the focal length is $$f = a\left(\frac{n_2+n_1}{n_2}\right) = a + ea \quad (7)$$

The quantity a is the distance along the x axis from the vertex of the conic section to its center, and ea is the distance from the center to the focus.

Since the focal length is proportional to the semi-major axis, and the eccentricity (Eq. (6)) depends only on the indices of refraction, scaling the lens' dimensions uniformly also scales the focal length.

Theoretically, the maximum numerical aperture for a plano-elliptical lens is:

$$M.N.A._{ell} = n^2 \left(\frac{b}{a}\right) = \sqrt{n_2^2 - n_1^2} \quad (8)$$

where $n_2$=the index of refraction in the lens, $n_1$ =the index of refraction in the surrounding media, a=the distance of the semi-major axis of the ellipse, and b =the distance of the semi-minor axis of the ellipse. If the elliptical lens is in air, as is usual, then the maximum numerical aperture is:

$$M.N.A._{ell} = \sqrt{n^2 - 1} \quad . \quad (9)$$

For example, if the elliptical lens is made of a material having an index of 1.78 at 800 nm, then the maximum possible numerical aperture is 1.47. A higher index lens material would of course provide a higher numerical aperture.

In fabricating a plano-elliptical cylindrical lens, a 0.75 cm wide preform was generated from a stock rod (having an index of 1.78 at 800 nm) on a numerically controlled universal grinder. The elliptical lens had a focal length of 220 microns, and the index of refraction was 1.78. The semi-major axis a=141.0 microns, the semi-minor axis b=117.0 microns, and the eccentricity e=0.56. The lens thickness was chosen to approximately match the focal length of 220 microns so that the lens could be attached directly to the output facet of a laser diode using index matched optical cement. Furthermore, full diffraction-limited performance was observed using an interferogram analysis. Diffraction limited performance over a 150 micron aperture (N.A. =0.6) was determined by means of interferometric analysis.

Changes and modifications in the specifically described embodiments can be carried out without departing from the scope of the invention, which is intended to be limited by the scope of the appended claims.

We claim:

1. A system-t for coupling light from a microchannel cooled, microlens conditioned semiconductor laser diode array into a fiber optic, comprising:

a microchannel cooled, microlens conditioned semiconductor laser diode array for producing laser light;

a fiber optic having an input aperture; and a lens to focus said laser light into said input aperture, wherein the focal length of said lens is chosen such that the divergence of said laser light after it passes through said lens is ≦ the numerical aperture of said fiber optic wherein said lens focuses said laser light to a spot having a size that is ≦ said input aperture wherein each diode laser of said laser diode array produces a beam, wherein the maximum angle of divergence of said beam is $$\tan^{-1}\left(\frac{A}{\sqrt{2}}/F\right),$$

where A is the side length of a square aperture of said laser light, and F is the focal length of said lens.

2. The apparatus of claim 1, wherein said semiconductor laser diode array comprises a five diode bar stack of 5 mm long AlGaInP laser diode bars for emitting said laser light at about 690 nm, wherein said fiber optic comprises fused silica having a 1 mm core and a numerical aperture of 0.37, and wherein said lens comprises a spherical configuration and a 1 cm focal length.

3. The apparatus of claim 1, wherein said semiconductor laser diode array comprises semiconductor material selected from a group consisting of AlGaAs, InGaAs and AlGaInP.

4. The apparatus of claim 1, wherein said semiconductor laser diode array produces laser light having an aperture of 5 mm×5 mm.

5. The apparatus of claim 1, wherein said semiconductor laser diode array comprises a microchannel heat sink thermally coupled to each laser diode bar of said array in a compact, thin planar package, wherein said laser diode bar is located proximate to one edge of said microchannel heat sink.

6. The apparatus of claim 1, wherein said microlens comprises at least one cylindrical lens configured to collect light from said at least one semiconductor laser diode array.

7. The apparatus of claim 1, wherein said semiconductor laser diode array comprises a thin planar assembly thermally and electrically connected to each diode laser of said array, said planar assembly comprising a heat sink region actively cooled by a coolant, said heat sink region comprising internal microchannels, said heat sink region being thermally connected to said diode laser so that heat is conducted between said diode and said heat sink region, said assembly further comprising:

an inlet corridor providing coolant to said assembly;

an inlet manifold integral in the assembly, said inlet manifold providing coolant flow between said inlet corridor and said microchannels in said heat sink region;

an outlet corridor removing coolant from said assembly; and an outlet manifold integral in said assembly, said outlet manifold providing coolant flow between said microchannels in said heat sink region and said outlet corridor, wherein said planar assembly further comprises a top layer, a middle layer, and a bottom layer bonded together;

said top layer and said middle layer defining said microchannels in said heat sink region and said outlet manifold;

said bottom layer and said middle layer defining said inlet manifold; and said middle layer comprising a slot between said inlet manifold and said microchannels in said heat sink region.

8. The apparatus of claim 1, wherein said semiconductor laser diode array comprises a plurality of thin planar packages actively cooled with a coolant circulation system, said packages being stacked to form said array, each of said packages having an edge-emitting laser diode mounted thereon, and each of said packages comprising:

means for cooling the laser diode mounted thereon, said cooling means including a microchannel cooler positioned under said laser diode, said microchannels having a shape to provide a passage for flow of a liquid coolant, said edge-emitting laser diodes being positioned so they emit light in a direction substantially parallel to the planes defined by said thin planar packages;

said plurality of packages, when connected together, defining an inlet corridor that provides a passageway for coolant flow between said microchannel coolers and the coolant circulation system, and further defining an outlet corridor that provides a passageway for coolant flow between said microchannel coolers and said coolant circulation system;

wherein each planar package further comprises a top layer, a middle layer, and a bottom layer bonded together:

said top layer and said middle layer defining an outlet passageway connecting the microchannel cooler with said outlet corridor;

said bottom layer and said middle layer defining an inlet passageway connected to said inlet corridor; and said middle layer comprising a slot defining a passageway between said inlet passageway and said microchannel cooler.

9. The apparatus of claim 8, wherein said cylindrical lens comprises:

a first optical surface; and, a second optical surface positioned between 50 and 1000 microns of the first surface;

said first and second surfaces being formed so that the lens is substantially diffraction limited over its numerical aperture;

said cylindrical microlens having a numerical aperture greater than 0.4.

\* \* \* \* \*